United States Patent
Jiang

(10) Patent No.: US 8,567,465 B2
(45) Date of Patent: Oct. 29, 2013

(54) SELF-SUPPORTING PNEUMATIC TIRE

(75) Inventor: Bing Jiang, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 252 days.

(21) Appl. No.: 13/224,556

(22) Filed: Sep. 2, 2011

(65) Prior Publication Data

US 2013/0056124 A1 Mar. 7, 2013

(51) Int. Cl.
 *B60C 17/00* (2006.01)
 *B60C 17/08* (2006.01)

(52) U.S. Cl.
 USPC .......................................... 152/516; 152/517

(58) Field of Classification Search
 None
 See application file for complete search history.

(56) References Cited

U.S. PATENT DOCUMENTS

| | | |
|---|---|---|
| 3,372,726 A | 3/1968 | Sidles |
| 3,782,440 A | 1/1974 | Depmeyer |
| 3,954,131 A * | 5/1976 | Hoshino et al. ............... 152/517 |
| 3,994,329 A | 11/1976 | Masson et al. |
| 4,111,249 A | 9/1978 | Markow |
| 4,405,007 A | 9/1983 | Welter |
| 4,456,048 A | 6/1984 | Markow et al. |
| 4,662,416 A | 5/1987 | Yagi et al. |
| 4,669,519 A | 6/1987 | Togashi et al. |
| 5,322,559 A | 6/1994 | Sleight |
| 6,182,728 B1 | 2/2001 | Williams et al. |
| 6,453,961 B1 | 9/2002 | Colantonio et al. |
| 6,843,293 B1 | 1/2005 | Corvasce et al. |
| 6,923,233 B1 | 8/2005 | Girault et al. |
| 6,988,522 B2 | 1/2006 | Colantonio et al. |
| 7,093,633 B2 | 8/2006 | Dahlberg et al. |
| 7,347,242 B2 | 3/2008 | Agostini et al. |
| 7,441,575 B2 | 10/2008 | Lechtenboehmer et al. |
| 2004/0110322 A1 | 6/2004 | Hougham et al. |
| 2007/0169869 A1 | 7/2007 | Ishida et al. |
| 2008/0006359 A1 | 1/2008 | Yamashita |
| 2008/0128066 A1 | 6/2008 | Mitarai et al. |
| 2009/0139623 A1 | 6/2009 | Kaiser |
| 2009/0314404 A1 | 12/2009 | Rodgers et al. |

FOREIGN PATENT DOCUMENTS

| | | |
|---|---|---|
| JP | 2003-326924 | * 11/2003 |
| JP | 2004-306771 | * 11/2004 |

OTHER PUBLICATIONS

Machine translation of JP 2004-306771, 2004.*
Machine translation of JP 2003-326924, 2003.*

* cited by examiner

*Primary Examiner* — Justin Fischer
(74) *Attorney, Agent, or Firm* — Robert N. Lipcsik

(57) ABSTRACT

A pneumatic tire comprises a carcass with a reinforcing ply structure extending between a pair of bead portions and a pair of sidewalls, a tread, a belt reinforcing structure located radially outward of the carcass and radially inward of the tread, and two inserts. Each insert is located in each sidewall. Each sidewall is located radially outward of one of the pair of bead portions. Each insert has a first material and a second material. The first material has a different coefficient of thermal expansion than the second material.

11 Claims, 2 Drawing Sheets

SELF-SUPPORTING PNEUMATIC TIRE

FIELD OF THE PRESENT INVENTION

The present invention is directed to a pneumatic radial tire capable of running in conditions wherein the tire is operated at less than a conventional inflation pressure.

BACKGROUND OF THE PRESENT INVENTION

Self-supporting run-flat tires have been commercialized for many years. The primary characteristic of such tires is reinforcing sidewall inserts for increasing the cross-sectional thickness of the sidewalls to strengthen the sidewalls. These tires, when operated in the uninflated condition, place the reinforcing sidewall inserts in compression. Due to the large amounts of rubber required to stiffen the sidewalls, heat build-up is a major factor in run-flat tire failure. This is especially true when the tire is operated for prolonged periods at high speeds in the uninflated condition.

One conventional tire has sidewall inserts to improve stiffness. Typically, six additional pounds of weight per tire are required to support an 800 lb load in an uninflated tire. The earliest commercial use of such runflat tires were used on a high performance vehicles and had a very low aspect ratio. The required support weight for an uninflated high performance vehicle tire, having aspect ratios in the 55% to 65% range or greater, may be 1400 lbs load. Such higher loads for larger run-flat tires required sidewalls and the overall tire to be stiffened to the point of compromising ride comfort. The conventional goal has been to provide a runflat tire with no loss in ride or performance characteristics in the inflated condition.

In very stiff suspension, high performance vehicles, the ability to provide such a tire has been comparatively easy compared to luxury sedans with softer ride requirements. Light truck and sport utility vehicles, although not as sensitive to ride performance, provide a runflat tire market that ranges from accepting a stiffer ride to demanding the softer luxury type ride.

Another conventional tire may be molded in such a manner that ride comfort is improved, durability is increased, and a greater run-flat capability may be achieved. This self-supporting run-flat tire may be molded such that the molded bead base width is equal or less than the rim width of the intended rim upon which the tire is to be mounted.

This conventional tire may have a carcass, a tread, and a belt reinforcing structure located radially outward of the carcass and radially inward of the tread. The carcass may be comprised of a reinforcing ply structure extending between a pair of bead portions, a pair of sidewalls, each sidewall located radially outward of one of the pair of bead portions, and an insert located in each sidewall. Each bead portion may have a bead heel wherein the axial distance between the two bead heels before the tire is inflated is equal or less than after the tire is inflated. By providing bead heels with such a defined width, inserts may not be subjected to additional stress upon inflation. This may change the loading on the inserts and the carcass ply, leading to improved tire characteristics.

This conventional tire may have inserts in each sidewall located axially inward of the carcass reinforcing ply structure, or may have a pair of inserts, with one insert located axially inward of the carcass reinforcing ply structure and another located axially outward of the carcass reinforcing ply structure. The inserts may be formed of two different elastomeric materials. The bead portions may include bead cores with one bead core located in each bead portion. The inserts may have radially outer ends and radially inner ends with the radially outer ends being located radially inward of the belt reinforcing structure and the radially inner ends being located radially outward of the bead cores.

SUMMARY OF THE PRESENT INVENTION

A pneumatic tire in accordance with the present invention comprises a carcass with a reinforcing ply structure extending between a pair of bead portions and a pair of sidewalls, a tread, a belt reinforcing structure located radially outward of the carcass and radially inward of the tread, and two inserts. Each insert is located in each sidewall. Each sidewall is located radially outward of one of the pair of bead portions. Each insert has a first material and a second material. The first material has a different coefficient of thermal expansion than the second material.

According to another aspect of the present invention, the insert in each sidewall is located axially inward of the carcass reinforcing ply structure and axially outward of an innerliner.

According to still another aspect of the present invention, the first and second parts are formed of two different elastomeric materials.

According to yet another aspect of the present invention, the first part is bonded to the second part.

According to still another aspect of the present invention, a middle part of the insert is not bonded to the carcass ply structure.

According to yet another aspect of the present invention, the first part of the insert includes reinforcing cords.

According to still another aspect of the present invention, the second part of the insert includes reinforcing cords.

According to yet another aspect of the present invention, the first part of the insert includes reinforcing organic cords.

According to still another aspect of the present invention, the second part of the insert includes reinforcing inorganic cords.

According to yet another aspect of the present invention, the first part of the insert includes reinforcing metal filaments.

According to still another aspect of the present invention, the second part of the insert includes reinforcing metal filaments.

According to yet another aspect of the present invention, the first part of the insert includes reinforcing fibers.

According to still another aspect of the present invention, the second part of the insert includes reinforcing fibers.

According to yet another aspect of the present invention, the second part of the insert includes reinforcing metal filaments.

According to still another aspect of the present invention, the second part of the insert includes inorganic short fibers.

According to yet another aspect of the present invention, the second part of the insert includes reinforcing metal filaments.

According to still another aspect of the present invention, the second part of the insert includes metal cords.

DEFINITIONS

The following definitions are controlling for the disclosed invention.

"Apex" means an elastomeric filler located radially above the bead core and between the plies and the turnup ply.

"Annular" means formed like a ring.

"Aspect ratio" means the ratio of its section height to its section width.

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two annular layers or plies of parallel cords, woven or unwoven, underlying the tread, unanchored to the bead, and having cords inclined respect to the equatorial plane of the tire. The belt structure may also include plies of parallel cords inclined at relatively low angles, acting as restricting layers.

"Bias tire" (cross ply) means a tire in which the reinforcing cords in the carcass ply extend diagonally across the tire from bead to bead at about a 25°-65° angle with respect to equatorial plane of the tire. If multiple plies are present, the ply cords run at opposite angles in alternating layers.

"Breakers" means at least two annular layers or plies of parallel reinforcement cords having the same angle with reference to the equatorial plane of the tire as the parallel reinforcing cords in carcass plies. Breakers are usually associated with bias tires.

"Cable" means a cord formed by twisting together two or more plied yarns.

"Carcass" means the tire structure apart from the belt structure, tread, undertread, and sidewall rubber over the plies, but including the beads.

"Casing" means the carcass, belt structure, beads, sidewalls and all other components of the tire excepting the tread and undertread, i.e., the whole tire.

"Chipper" refers to a narrow band of fabric or steel cords located in the bead area whose function is to reinforce the bead area and stabilize the radially inwardmost part of the sidewall.

"Circumferential" means lines or directions extending along the perimeter of the surface of the annular tire parallel to the Equatorial Plane (EP) and perpendicular to the axial direction; it can also refer to the direction of the sets of adjacent circular curves whose radii define the axial curvature of the tread, as viewed in cross section.

"Cord" means one of the reinforcement strands of which the reinforcement structures of the tire are comprised.

"Cord angle" means the acute angle, left or right in a plan view of the tire, formed by a cord with respect to the equatorial plane. The "cord angle" is measured in a cured but uninflated tire.

"Crown" means that portion of the tire within the width limits of the tire tread.

"Denier" means the weight in grams per 9000 meters (unit for expressing linear density). "Dtex" means the weight in grams per 10,000 meters.

"Density" means weight per unit length.

"Elastomer" means a resilient material capable of recovering size and shape after deformation.

"Equatorial plane (EP)" means the plane perpendicular to the tire's axis of rotation and passing through the center of its tread; or the plane containing the circumferential centerline of the tread.

"Fabric" means a network of essentially unidirectionally extending cords, which may be twisted, and which in turn are composed of a plurality of a multiplicity of filaments (which may also be twisted) of a high modulus material.

"Fiber" is a unit of matter, either natural or man-made that forms the basic element of filaments. Characterized by having a length at least 100 times its diameter or width.

"Filament count" means the number of filaments that make up a yarn. Example: 1000 denier polyester has approximately 190 filaments.

"Flipper" refers to a reinforcing fabric around the bead wire for strength and to tie the bead wire in the tire body.

"Gauge" refers generally to a measurement, and specifically to a thickness measurement.

"High Tensile Steel (HT)" means a carbon steel with a tensile strength of at least 3400 MPa at 0.20 mm filament diameter.

"Inner" means toward the inside of the tire and "outer" means toward its exterior.

"Innerliner" means the layer or layers of elastomer or other material that form the inside surface of a tubeless tire and that contain the inflating fluid within the tire.

"LASE" is load at specified elongation.

"Lateral" means an axial direction.

"Lay length" means the distance at which a twisted filament or strand travels to make a 360 degree rotation about another filament or strand.

"Load Range" means load and inflation limits for a given tire used in a specific type of service as defined by tables in The Tire and Rim Association, Inc.

"Mega Tensile Steel (MT)" means a carbon steel with a tensile strength of at least 4500 MPa at 0.20 mm filament diameter.

"Normal Load" means the specific design inflation pressure and load assigned by the appropriate standards organization for the service condition for the tire.

"Normal Tensile Steel (NT)" means a carbon steel with a tensile strength of at least 2800 MPa at 0.20 mm filament diameter.

"Ply" means a cord-reinforced layer of rubber-coated radially deployed or otherwise parallel cords.

"Radial" and "radially" are used to mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Rivet" means an open space between cords in a layer.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Self-supporting run-flat" means a type of tire that has a structure wherein the tire structure alone is sufficiently strong to support the vehicle load when the tire is operated in the uninflated condition for limited periods of time and limited speed. The sidewall and internal surfaces of the tire may not collapse or buckle onto themselves due to the tire structure alone (e.g., no internal structures).

"Sidewall insert" means elastomer or cord reinforcements located in the sidewall region of a tire. The insert may be an addition to the carcass reinforcing ply and outer sidewall rubber that forms the outer surface of the tire.

"Sidewall" means that portion of a tire between the tread and the bead.

"Spring Rate" means the stiffness of tire expressed as the slope of the load deflection curve at a given pressure.

"Stiffness ratio" means the value of a control belt structure stiffness divided by the value of another belt structure stiffness when the values are determined by a fixed three point bending test having both ends of the cord supported and flexed by a load centered between the fixed ends.

"Super Tensile Steel (ST)" means a carbon steel with a tensile strength of at least 3650 MPa at 0.20 mm filament diameter.

"Tenacity" is stress expressed as force per unit linear density of the unstrained specimen (gm/tex or gm/denier). Used in textiles.

"Tensile" is stress expressed in forces/cross-sectional area. Strength in psi=12,800 times specific gravity times tenacity in grams per denier.

"Toe guard" refers to the circumferentially deployed elastomeric rim-contacting portion of the tire axially inward of each bead.

"Tread" means a molded rubber component which, when bonded to a tire casing, includes that portion of the tire that comes into contact with the road when the tire is normally inflated and under normal load.

"Tread width" means the arc length of the tread surface in a plane including the axis of rotation of the tire.

"Turnup end" means the portion of a carcass ply that turns upward (i.e., radially outward) from the beads about which the ply is wrapped.

"Ultra Tensile Steel (UT)" means a carbon steel with a tensile strength of at least 4000 MPa at 0.20 mm filament diameter.

"Vertical Deflection" means the amount that a tire deflects under load.

"Yarn" is a generic term for a continuous strand of textile fibers or filaments. Yarn occurs in the following forms: 1) a number of fibers twisted together; 2) a number of filaments laid together without twist; 3) a number of filaments laid together with a degree of twist; 4) a single filament with or without twist (monofilament); 5) a narrow strip of material with or without twist.

BRIEF DESCRIPTION OF THE DRAWINGS

The invention will be described by way of example and with reference to the accompanying drawings in which.

DETAILED DESCRIPTION OF AN EXAMPLE EMBODIMENT OF THE PRESENT INVENTION

The following language is of the best presently contemplated mode or modes of carrying out the invention. This description is made for the purpose of illustrating the general principals of the invention and should not be taken in a limiting sense. The scope of the invention is best determined by reference to the appended claims.

Figure 1:
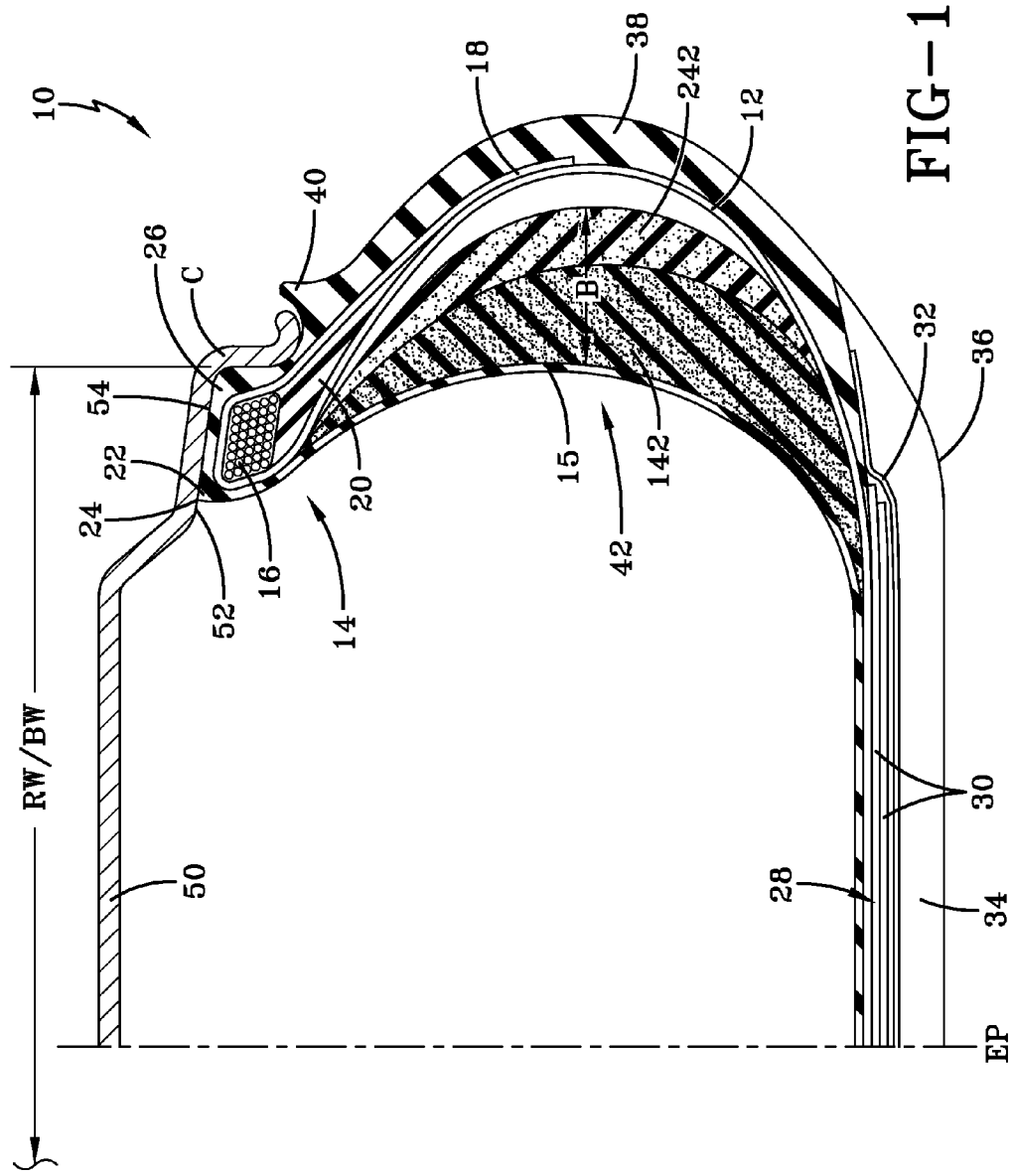
FIG. 1 is a schematic cross-sectional view of an example tire in accordance with the present invention under an inflated condition.

FIG. 1 shows an example self-supporting run-flat tire 10 in accordance with the present invention. Only one half of the cross-sectional configuration of the tire 10 is illustrated. It will be readily understood by those in the art that the non-illustrated half of the tire 10 may be the mirror-image of that which is illustrated, or may be an asymmetrical half of the tire. The tire 10 may have a carcass comprising a reinforcing ply 12 that extends from one bead portion 14 to an opposing bead portion 14 (not shown). The ends of the reinforcing ply 12 may pass radially inward of an inextensible bead core 16 and form a turn-up portion 18 extending toward the maximum sectional width or the mid-height of the tire 10.

In the bead portions 14, radially outward of the bead core 16, and between the main portion of the reinforcing ply 12 and the turn-up portions 18 may be bead apexes 20. Each apex 20 may be formed of a relatively high Shore A hardness material. Each bead portion 14 may be defined by a bead base 22, a bead toe 24, and a bead heel 26. The bead base 22 may be an approximately cylindrical portion of the bead portion 14 that forms an inside diameter. The bead toe 24 may be part of the bead portion 14 that joins the bead base 22 and the inside surface of the tire 10 and may be axially inward of the bead heel 26. The bead heel 26 may be the part of the bead portion 14 that joins the bead base 22 and the outer surface of the tire 10. The molded bead width BW of the tire 10 may be the axial distance measured between opposing bead heels 26. The bead portion 14 may also include other non-illustrated elements such as flippers, chippers, toe guards, chafers, etc.

Radially outward of the main portion of the carcass reinforcing ply 12 may be a belt structure 28. The belt structure 28 may have two plies 30 formed from inclined parallel reinforcing cords. The cords may be inclined at an angle of 17° to 27° relative to an equatorial plane EP of the tire 10. The cords in each ply 30 may be crossed at equal and opposite angles to the cords in the other adjacent ply 30. Outward of the two inclined cord plies 30 may be an overlay 32. The overlay 32 may be formed of cords inclined at 0° to about 5° relative to the equatorial plane EP. While illustrated radially outward of the inclined cord plies 30, the overlay 32 may actually be located between the inclined cord plies 30 or radially inward of the inclined cord plies 30.

Outward of the belt structure 28 and the overlay 32 may be a tread 34 that forms the ground contacting surface of the example tire 10. Extending from the tread edges 36 may be the tire sidewalls 38. The lower portion of the sidewalls 38 may be defined by a protective rib 40. The location of the protective ribs 40 may depend upon the tire height. The ribs 40 may be located relatively higher up the sidewall 38 when the tire height is smaller, and relatively lower along the sidewall 38 when the tire height is greater.

Axially inward of the carcass reinforcing ply 12 and in the sidewall 38 of the tire 10 may be a two-part insert 42 in accordance with the present invention. The shape of the insert 42 in an inflated and loaded condition of the tire 10 (FIG. 1) may be substantially crescent in shape, or lenticular. The two-part inserts 42 may have a maximum thickness B at a location between the tread edges 36 and the radial location of the maximum section width of the tire 10. An innerliner 15 may be located axially inward (FIGS. 1 & 2) or axially outward (not shown) of the insert 42.

The function of the inserts 42 may be to stiffen/support the sidewalls 38 of the tire 10 when the tire is operated at low, reduced, or insignificant inflation pressure. As stated above, the elastomeric inserts 42 may have a substantially crescent cross-sectional shape and material properties selected to enhance inflated ride performance while promoting the tire's run-flat durability. One or both parts of the inserts 42, if desired, may also be individually reinforced with organic or inorganic cords, organic or inorganic fibers, metal filaments, organic or inorganic short fibers, short filaments, etc. Thus, one or both parts of the inserts 42 may be so reinforced.

FIG. 1 further shows the example tire 10 mounted on a tire rim 50. The tire rim 50 may have a design and rim width as specified by the industry standards in effect in the world region in which the tire rim 50 and tire 10 are to be used. Where the tire rim 50 contacts the tire 10, the rim 50 has two main components, the bead seat 52 and the rim flange 54, the seat 52 and flange 54 connecting at a point C. The rim 50 may have a maximum axial width RW.

After deflation and under load, a conventional sidewall may buckle due to small bending stiffness. For this reason, sidewall inserts may be added to increase sidewall thickness and cross-sectional area to increase bending stiffness of the sidewall after deflation. However, increasing sidewall stiffness may also decrease ride comfort, as well as negatively affect other tire functional properties. In accordance with the present invention, the sidewall insert 42 may be constructed to buckle toward the inside of tire 10 (e.g., opposite the buckling of the conventional insert) under deflation and load (FIG. 2).

Such an insert 42 may have a composite construction with two different materials bonded to each other. One part 142 may have a higher thermal expansion than the other part 242. The insert 42 may not be attached to the sidewall 38 between its ends (e.g., unlike a conventional insert that may be bonded to the inner surface of the sidewall). Under inflation and load, air pressure may act on the insert 42 in a direction toward the adjacent sidewall 38 and the tire 10 may operate as a conventional runflat or pneumatic tire (FIG. 1). Upon deflation and under load, without air pressure acting on the insert 42, the insert may partially recover to its natural position (e.g., linear). However, due to temperature increase, the part 142 with a high thermal expansion will expand more than the part 242 with the lower thermal expansion. This may bias the insert 42 to buckling toward the equatorial plane EP of the tire 10 (FIG. 2) without the air pressure acting on the insert. The sidewall 38 and the insert 42 may thereby form a "tube" having a higher bending stiffness than the sidewall and insert buckled away from the equatorial plane EP of the tire 10. The combined bending stiffness of the sidewall 38 and insert 42 may thereby be increased under deflation and load of the tire 10 without a substantial increase in bending stiffness of the sidewall and insert under inflation and load (e.g., ride comfort decrease may be mitigated).

Figure 2:
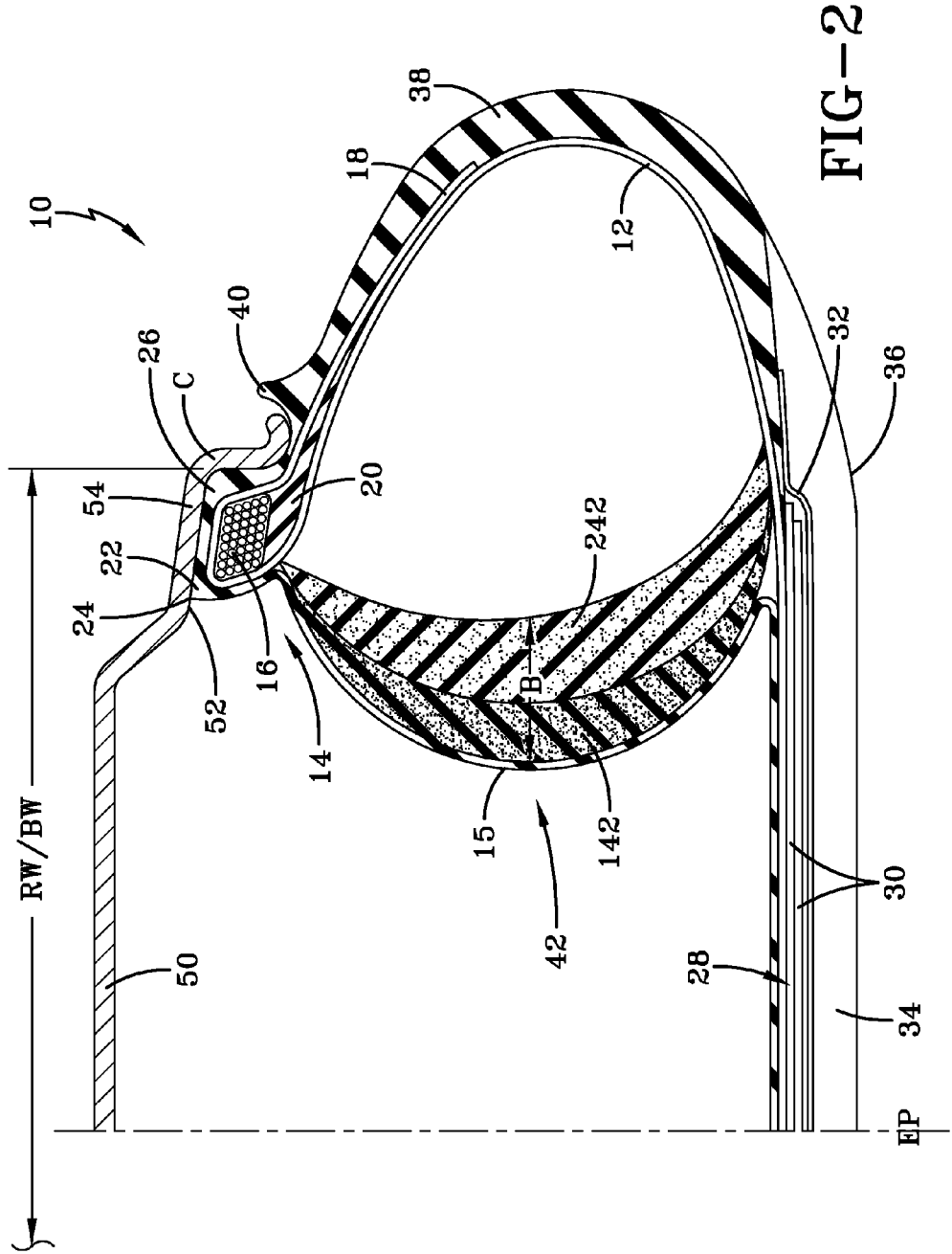
FIG. 2 is a schematic cross-sectional view of the tire of FIG. 1 under an uninflated condition.

The crescent shape of the insert 42 in FIG. 1 with the higher thermal expansion part 142 under less bending stress and less temperature expansion (e.g., inflated operation temperature may be less than deflated running temperature) may produce less load stiffness and better ride comfort than the crescent shape of the insert 42 in FIG. 2 with the higher thermal expansion part 142 under more bending stress and greater temperature expansion (e.g., inflated operation temperature may be less than deflated running temperature). Further, the insert 42 not being completely bonded to the sidewall 38 may reduce stiffness of the sidewall/insert during inflated and loaded conditions also producing better inflated ride comfort. The overall thickness B of the insert 42 may be reduced and still produce the same deflated load bearing ability as a conventional, thicker insert. With a thinner insert 42, curing time and repair time may also be reduced.

As stated above, an insert 42 in accordance with the present invention produces excellent inflated and runflat characteristics in a pneumatic tire 10. This insert 42 thus enhances the performance of the tire pneumatic 10 in two distinct modes of operation, even though the complexities of the structure and behavior of the pneumatic tire are such that no complete and satisfactory theory has been propounded. Temple, *Mechanics of Pneumatic Tires* (2005). While the fundamentals of classical composite theory are easily seen in pneumatic tire mechanics, the additional complexity introduced by the many structural components of pneumatic tires readily complicates the problem of predicting tire performance. Mayni, *Composite Effects on Tire Mechanics* (2005). Additionally, because of the non-linear time, frequency, and temperature behaviors of polymers and rubber, analytical design of pneumatic tires is one of the most challenging and underappreciated engineering challenges in today's industry. Mayni.

A pneumatic tire has certain essential structural elements. United States Department of Transportation, *Mechanics of Pneumatic Tires*, pages 207-208 (1981). An important structural element is the runflat insert, typically made up a low modulus polymeric material, usually natural or synthetic rubber. Id. at 207 through 208.

These complexities are demonstrated by the below table of the interrelationships between tire performance and tire components.

|  | LINER | CARCASS PLY | INSERT | BELT PLY | OV'LY | TREAD | MOLD |
|---|---|---|---|---|---|---|---|
| TREADWEAR |  |  |  | X |  | X | X |
| NOISE |  | X | X | X | X | X | X |
| HANDLING |  | X | X | X | X | X | X |
| TRACTION |  |  |  |  |  | X | X |
| DURABILITY | X | X | X | X | X | X | X |
| ROLL RESIST | X |  | X | X |  | X | X |
| RIDE COMFORT | X | X | X |  |  | X |  |
| HIGH SPEED |  | X | X | X | X | X | X |
| AIR RETENTION | X |  |  |  |  |  |  |
| MASS | X | X | X | X | X | X | X |

As seen in the table, the insert characteristics affect the other components of a pneumatic tire (i.e., insert structure affects carcass ply, belt ply, overlay, etc.), leading to a number of components interrelating and interacting in such a way as to affect a group of functional properties (noise, handling, durability, comfort, high speed, and mass in two modes of operation, inflated and deflated), resulting in a completely unpredictable and complex composite. Thus, changing even one component can lead to directly improving or degrading as many as the above ten functional characteristics, in either mode, as well as altering the interaction between that one component and as many as six other structural components. Each of those six interactions may thereby indirectly improve or degrade those ten functional characteristics. Whether each of these functional characteristics is improved, degraded, or unaffected, in which mode, and by what amount, certainly would have been unpredictable without the experimentation and testing conducted by the inventors.

Thus, for example, when the structure of the insert of a pneumatic tire is modified with the intent to improve one functional property of the pneumatic tire, any number of other functional properties may be unacceptably degraded. Furthermore, the interaction between the insert structure and the carcass ply, belt ply, overlay, and tread may also unacceptably affect the functional properties of the pneumatic tire. A modification of the insert structure may not even improve that one functional property (e.g., inflated comfort) because of these complex interrelationships.

Thus, as stated above, the complexity of the interrelationships of the multiple components makes the actual result of modification of an insert 42 in accordance with the present invention, impossible to predict or foresee from the infinite possible results. Only through extensive experimentation has the insert 42 of the present invention been revealed as an excellent, albeit unexpected and unpredictable, option for a pneumatic tire.

The previous descriptive language is of the best presently contemplated mode or modes of carrying out the present invention. This description is made for the purpose of illustrating an example of general principles of the present invention and should not be interpreted as limiting the present invention. The scope of the invention is best determined by reference to the appended claims. The reference numerals as depicted in the schematic drawings are the same as those referred to in the specification. For purposes of this application, the various examples illustrated in the figures each use a same reference numeral for similar components. The examples structures may employ similar components with variations in location or quantity thereby giving rise to alternative constructions in accordance with the present invention.

What is claimed is:

1. A pneumatic tire comprising:
    a carcass comprising a reinforcing ply structure extending between a pair of bead portions, a pair of sidewalls, each sidewall located radially outward of one of the pair of bead portions;
    a tread;
    a belt reinforcing structure located radially outward of the carcass and radially inward of the tread; and
    an insert located in each sidewall, each insert having a first part constructed of a first material and a second part constructed of a second material, the first material having a different coefficient of thermal expansion than the second material,
    the insert in each sidewall being located axially inward of the carcass reinforcing ply structure and axially outward of an innerliner, the first part being bonded to the second part, a middle part of the insert being not bonded to the carcass ply structure, the first part of the insert including reinforcing organic cords, the second part of the insert including reinforcing inorganic cords,
    the pneumatic tire having a structure such that, under deflation and load, the insert buckles toward an equatorial plane of the pneumatic tire and away from the carcass.

2. The tire as set forth in claim 1 wherein the first and second parts are formed of two different elastomeric materials.

3. The tire as set forth in claim 1 wherein the first part of the insert includes reinforcing cords.

4. The tire as set forth in claim 1 wherein the second part of the insert includes reinforcing cords.

5. The tire as set forth in claim 1 wherein the second part of the insert includes reinforcing metal filaments.

6. The tire as set forth in claim 1 wherein the first part of the insert includes reinforcing fibers.

7. The tire as set forth in claim 6 wherein the second part of the insert includes reinforcing fibers.

8. The tire as set forth in claim 6 wherein the second part of the insert includes reinforcing metal filaments.

9. The tire as set forth in claim 6 wherein the second part of the insert includes inorganic short fibers.

10. The tire as set forth in claim 6 wherein the second part of the insert includes reinforcing metal filaments.

11. The tire as set forth in claim 6 wherein the second part of the insert includes metal cords.

* * * * *